(12) United States Patent
Olson

(10) Patent No.: US 11,608,035 B2
(45) Date of Patent: Mar. 21, 2023

(54) TIRE SERVICE TRACKING AND NOTIFICATION

(71) Applicant: Zach Olson, Park City, UT (US)

(72) Inventor: Zach Olson, Park City, UT (US)

(*) Notice: Subject to any disclaimer, the term of this patent is extended or adjusted under 35 U.S.C. 154(b) by 384 days.

(21) Appl. No.: 17/018,699

(22) Filed: Sep. 11, 2020

(65) Prior Publication Data

US 2021/0284104 A1 Sep. 16, 2021

Related U.S. Application Data

(60) Provisional application No. 62/987,852, filed on Mar. 10, 2020.

(51) Int. Cl.
| | | |
|---|---|---|
| *G06Q 20/12* | (2012.01) | |
| *B60S 5/00* | (2006.01) | |
| *G06Q 30/0601* | (2023.01) | |
| *B60C 25/05* | (2006.01) | |
| *G01C 22/00* | (2006.01) | |
| *B60Q 9/00* | (2006.01) | |
| *B60C 25/00* | (2006.01) | |
| *G01S 19/39* | (2010.01) | |

(52) U.S. Cl.
CPC .............. *B60S 5/00* (2013.01); *B60C 25/007* (2013.01); *B60C 25/0554* (2013.01); *B60Q 9/00* (2013.01); *G01C 22/00* (2013.01); *G01S 19/39* (2013.01); *G06Q 20/12* (2013.01); *G06Q 30/0625* (2013.01)

(58) Field of Classification Search
CPC combination set(s) only.
See application file for complete search history.

(56) References Cited

U.S. PATENT DOCUMENTS

| | | |
|---|---|---|
| 8,655,544 B2 | 2/2014 | Fletcher et al. |
| 8,958,943 B2 | 2/2015 | Bertosa et al. |
| 9,079,461 B2 | 7/2015 | Suh et al. |
| 9,873,293 B2 | 1/2018 | Singh et al. |
| 10,144,253 B2 | 12/2018 | Mays et al. |
| 10,350,949 B2 | 7/2019 | Surendra |
| 2016/0163130 A1 | 6/2016 | Zagajac et al. |
| 2018/0096542 A1 | 4/2018 | Mader et al. |
| 2019/0255891 A1 | 8/2019 | Makke et al. |

FOREIGN PATENT DOCUMENTS

GB 2531746 5/2016

OTHER PUBLICATIONS

Siegel et al., Smartphone-Based Vehicular Tire Pressure and Condition Monitoring, SAI Intelligent Systems Conference 2016, pp. 446-456, London UK.

*Primary Examiner* — Mathew Franklin Gordon
(74) *Attorney, Agent, or Firm* — Kunzler Bean & Adamson

(57) ABSTRACT

A method and computer program product are disclosed. The method includes tracking a distance travelled on a set of tires, determining a threshold, determining whether the distance travelled has exceeded the threshold, and notifying the user that the distance travelled has exceeded the threshold. The computer program product includes code to perform tracking a distance travelled on a set of tires, determining a threshold, determining whether the distance travelled has exceeded the threshold, and notifying the user that the distance travelled has exceeded the threshold.

20 Claims, 9 Drawing Sheets

TIRE SERVICE TRACKING AND NOTIFICATION

CROSS-REFERENCE TO RELATED APPLICATION

This application claims the benefit of U.S. Provisional Patent Application No. 62/987,852, filed Mar. 10, 2020, which is incorporated herein by reference.

FIELD

The present application relates generally to vehicle maintenance, and more particularly to systems and methods for monitoring tire wear and managing tire replacement.

BACKGROUND

Drivers often need to monitor various different parameters for the regular maintenance of their vehicles. One of these parameters, which is often overlooked, is the amount of wear on the tires of the vehicle. Many drivers neglect to regularly check the wear of their tires, and those who do must engage in a repetitive tire wear monitoring schedule, which is usually done through individual and manual inspection. Additionally, when one does need to source replacement tires, finding the correct size(s) and configuration(s) can be tiresome and complicated.

SUMMARY

The subject matter of the present application has been developed in response to the present state of the art, and in particular, in response to the problems and needs of tire wear monitoring of and tire replacement on vehicles. Monitoring tire wear is crucial for safe and efficient operation of a vehicle. However, monitoring tire wear manually is a tedious and repetitive process, often overlooked by drivers. Additionally, even if the need for tire replacement is noticed, sourcing the correct size and configuration of tires on a vehicle can be difficult, especially for those not familiar with tires and tire replacement. In view of the foregoing, the subject matter of the present application has been developed to provide solutions for tire wear monitoring and tire replacement, which overcome many of the shortcomings of the prior art.

A method is disclosed, comprising: tracking a distance travelled on a set of tires of a vehicle via global positioning system (GPS) tracking on a mobile device; determining a distance travelled threshold at which the set of tires should be serviced; determining whether the distance travelled has exceeded the distance travelled threshold; and notifying a user via the mobile device that the distance travelled has exceeded the distance travelled threshold and that tire service should be performed. The preceding subject matter of this paragraph characterizes example 1 of the present disclosure.

The method further comprises steps of retrieving service center availability information from a service center, prompting the user for user availability information, scheduling a service appointment with the tire service center based on the service center's availability information and the user availability information, and sending information about the scheduled service appointment to the service center. The preceding subject matter of this paragraph characterizes example 2 of the present disclosure, wherein example 2 also includes the subject matter according to example 1, above.

The method further comprises steps of prompting the user for information about the vehicle and identifying compatible tires based on the information about the vehicle. The preceding subject matter of this paragraph characterizes example 3 of the present disclosure, wherein example 3 also includes the subject matter according to any one of examples 1-2, above.

The method further comprises steps of taking a photo of one tire of the set of tires, extracting tire information from the photo, and searching for compatible tires based on the tire information extracted from the photo. The preceding subject matter of this paragraph characterizes example 4 of the present disclosure, wherein example 4 also includes the subject matter according to any one of examples 1-3, above.

The method further comprises a step of obtaining inventory availability information related to the compatible tires from a tire vendor. The preceding subject matter of this paragraph characterizes example 5 of the present disclosure, wherein example 5 also includes the subject matter according to example 4, above.

The method further comprises a step of redirecting the user to the tire vendor's website. The preceding subject matter of this paragraph characterizes example 6 of the present disclosure, wherein example 6 also includes the subject matter according to example 5, above.

The method further comprises steps of receiving payment information from the user and processing the payment information to purchase the compatible tires. The preceding subject matter of this paragraph characterizes example 7 of the present disclosure, wherein example 7 also includes the subject matter according to any one of examples 5-6, above.

The tire service to be performed comprises rotation of the set of tires. The preceding subject matter of this paragraph characterizes example 8 of the present disclosure, wherein example 8 also includes the subject matter according to any one of examples 1-7, above.

The tire service to be performed comprises replacement of the set of tires. The preceding subject matter of this paragraph characterizes example 9 of the present disclosure, wherein example 9 also includes the subject matter according to any one of examples 1-8, above.

The method further comprises steps of establishing a connection between the mobile device and the vehicle and determining whether the distance travelled should be tracked based on the presence of the connection between the mobile device and the vehicle. The preceding subject matter of this paragraph characterizes example 10 of the present disclosure, wherein example 10 also includes the subject matter according to any one of examples 1-9, above.

A computer program product is disclosed. The computer program product comprises a non-transitory computer readable storage medium that stores code executable by a processor. The executable code comprises code to perform: tracking a distance travelled on a set of tires of a vehicle via global positioning system (GPS) tracking on a mobile device; determining a distance travelled threshold at which the set of tires should be serviced; determining whether the distance travelled has exceeded the distance travelled threshold; and notifying a user via the mobile device that the distance travelled has exceeded the distance travelled threshold and that tire service should be performed. The preceding subject matter of this paragraph characterizes example 11 of the present disclosure.

The executable code further comprises code to perform steps of taking a photo of one tire of the set of tires, extracting tire information from the photo, and searching for compatible tires based on the tire information extracted from the photo. The preceding subject matter of this paragraph characterizes example 12 of the present disclosure, wherein example 12 also includes the subject matter according to example 11, above.

The executable code further comprises code to perform steps of prompting the user for information about the vehicle, and identifying compatible tires based on the information about the vehicle. The preceding subject matter of this paragraph characterizes example 13 of the present disclosure, wherein example 13 also includes the subject matter according to any one of examples 11-12, above.

The executable code further comprises code to perform steps of taking a photo of one tire of the set of tires, extracting tire information from the photo, and searching for compatible tires based on the tire information extracted from the photo. The preceding subject matter of this paragraph characterizes example 14 of the present disclosure, wherein example 14 also includes the subject matter according to any one of examples 11-13, above.

The executable code further comprises code to perform a step of obtaining inventory availability information related to the compatible tires from a tire vendor. The preceding subject matter of this paragraph characterizes example 15 of the present disclosure, wherein example 15 also includes the subject matter according to example 14, above.

The executable code further comprises code to perform a step of redirecting the user to the tire vendor's website. The preceding subject matter of this paragraph characterizes example 16 of the present disclosure, wherein example 16 also includes the subject matter according to example 15, above.

The executable code further comprises code to perform steps of receiving payment information from the user and processing the payment information to purchase the compatible tires. The preceding subject matter of this paragraph characterizes example 17 of the present disclosure, wherein example 17 also includes the subject matter according to any one of examples 15-16, above.

The tire service to be performed comprises rotation of the set of tires. The preceding subject matter of this paragraph characterizes example 18 of the present disclosure, wherein example 18 also includes the subject matter according to any one of examples 11-17, above.

The tire service to be performed comprises replacement of the set of tires. The preceding subject matter of this paragraph characterizes example 19 of the present disclosure, wherein example 19 also includes the subject matter according to any one of examples 11-18, above.

The executable code further comprises code to perform steps of establishing a connection between the mobile device and the vehicle, and determining whether the distance travelled should be tracked based on the presence of the connection between the mobile device and the vehicle. The preceding subject matter of this paragraph characterizes example 20 of the present disclosure, wherein example 20 also includes the subject matter according to any one of examples 11-19, above.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended numbered paragraphs, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1:
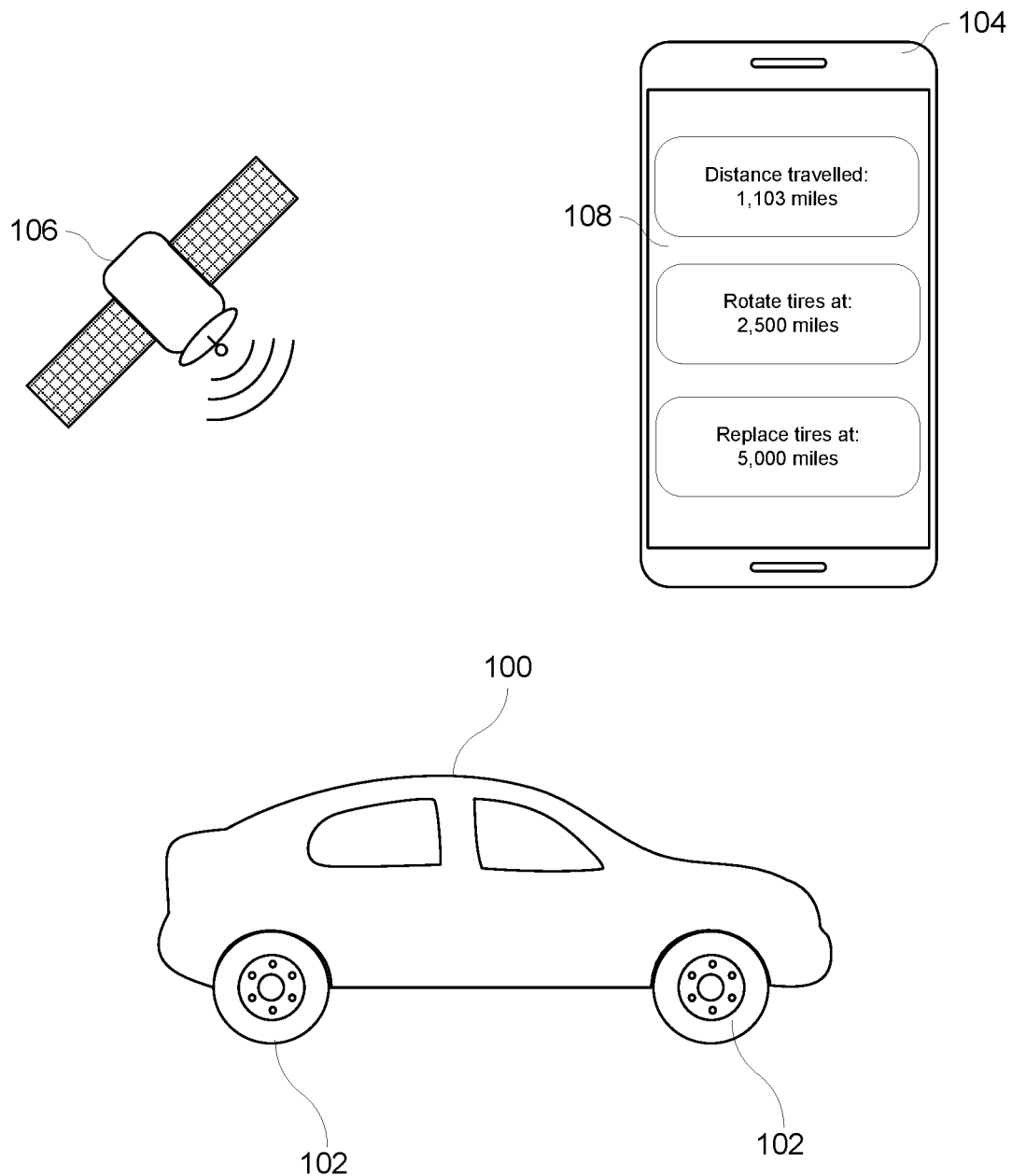
FIG. 1 is a schematic overview of a tire tracking and notification system according to an embodiment of the current subject matter.

FIG. 1 depicts an overview of the current subject matter. In some embodiments, the mileage of a vehicle 100 is tracked to determine when a tire 102 or tires should be rotated/replaced or other service should be performed. In some embodiments, this is done through a mobile device 104, a global positioning system (GPS) tracking system 106, and an application 108 running on the device. The mobile device 104 may be any device capable of receiving a GPS signal from the GPS tracking system 106, running the application 108, and otherwise providing the features described herein. The GPS tracking system 106 may be the standard GPS system operated by the United States government, or may be an alternative satellite location/tracking system such as GLONASS, Galileo, NavIC, QZSS, or other alternative systems capable of determining location and distance travelled.

In some embodiments, the mobile device 104 determines the amount of distance travelled in the vehicle 100 via GPS tracking through the GPS tracking system 106. In one example, this is achieved by the user carrying the mobile device 104 with herself in order to allow tracking of the mobile device 104, via the GPS tracking system 106 and the application 108, and therefore tracking of the vehicle during transit of the vehicle. By tracking the distance travelled for each trip in the vehicle 100, the application 108 on the mobile device 104 can store various statistics about the trips taken in the vehicle 100. These statistics can include, but are not limited to, a running total of distance travelled. In some embodiments, the application will alert the user when the amount of distance travelled has reached a predetermined threshold. In various embodiments, the application can be configured to alert the user to various situations, including rotation of the tires 102, replacement of the tires 102, changing from tires 102 suited for winter and tires 102 suited for summer (and vice-versa), and other situations that may require service of the vehicle 100.

Figure 2:
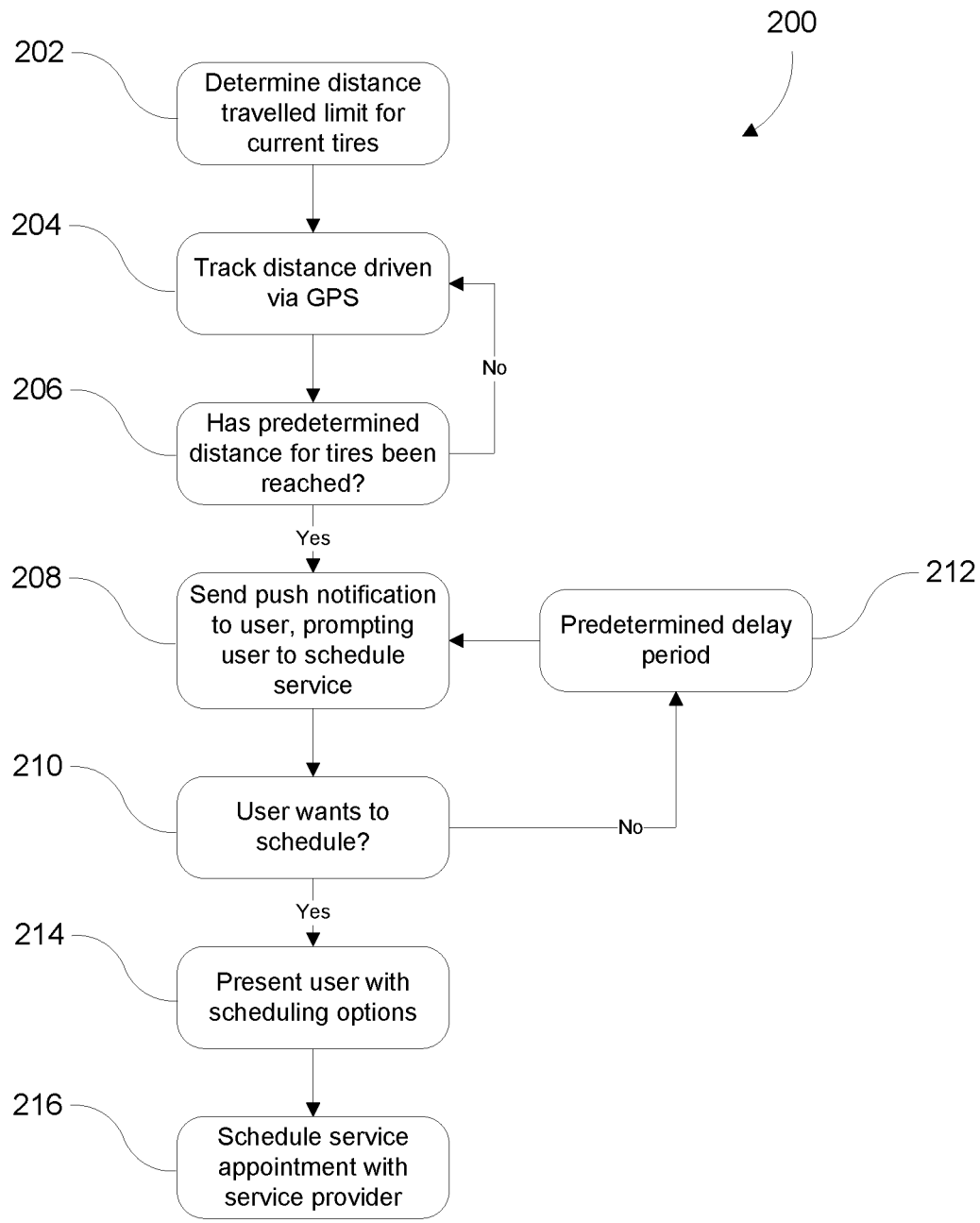
FIG. 2 is a flow-chart diagram of a method of tire tracking and notification according to an embodiment of the current subject matter.

FIG. 2 depicts a flow chart diagram of one embodiment of a method 200 for tire wear tracking and notification. In some embodiments, the method 200 includes step 202, in which a mileage limit is determined for the tires 102 currently on the vehicle 100. This mileage may be determined based on vehicle manufacturer specifications, tire manufacturer specification, a limit provided by the user, or from another source. This mileage, and any mileages discussed herein, may be measured in any units of distance convenient for the user.

In step 204 of the method 200, the application 108 on the mobile device 104 keeps a record of the distance travelled by the vehicle. In some embodiments, the user may manually activate the distance tracking. In some embodiments, the application 108 and the mobile device 104 may automatically begin counting the distance travelled based on a connection to the vehicle, such as a Bluetooth connection, NFC connection, or other connection indicating that the distance being travelled should be counted towards the distance travelled limit.

In some embodiments, the user may place the application 108 into a non-tracking mode. For example, if the user is not driving their own vehicle, but is riding in a friend's vehicle, using ridesharing services, or taking public transit, the distance travelled should not be counted towards the distance travelled limit. As such, the user may disable the application 108 such that the distance travelled does not incorrectly count towards the distance travelled on the tires 102 of the user's vehicle 100.

In step 206 of the method 200, a determination is made whether the amount of distance recorded has reached the predetermined distance for the current tires. If not, then the distance being travelled continues to be recorded. In some embodiments, the application 108 may display the amount of distance travelled and the predetermined limit of distance travelled to the user. In some embodiments, the application 108 may send "reminder" notifications after the distance travelled reaches predetermined amounts that are less than the distance travelled limit at which the tires 102 should be rotated, replaced, or otherwise serviced. Thus, a user may be reminded regularly that a rotation, replacement, or service time is approaching, and is not a surprise when the distance travelled limit is reached and rotation, replacement, or service is more urgent.

After the predetermined distance travelled for the tires has been reached, (for example, after the determination in step 206 results in a "yes" response), in step 208 of the method 200, the application 108 will send a notification to the user on the mobile device 104 (and/or another user device), to prompt the user to schedule the rotation, replacement, or other service. Such notifications can be delivered by various means, such as pop-ups, banners, audio notifications, email, text message, social media messaging, or other means.

In step 210 of the method 200, the application 108 receives input from the user in response to the prompt to schedule service executed at step 208. If the user does not want to schedule service at step 210, the application 108 moves to step 212, in which the application 108 waits a predetermined amount of time before again prompting the user to schedule service. In some embodiments, the distance travelled is still tracked during this waiting period. In yet some embodiments, after another threshold of distance travelled, which is higher than the distance travelled limit, is reached, the waiting period (e.g., the predetermined delay period) entered into at step 212 before repeating a notification to schedule service is reduced, so that the user is notified more frequently that the tires 102 are in need of service.

After the user responds that he does want to schedule service (for example, after a "yes" response is received from the user in step 210 of the method 200), in step 214 of the method 200, the application 108 presents the user with various scheduling options to schedule service for the tires 102. In some embodiments, the application 108 displays various different service providers, including information about the services providers, such as the locations of, contact information of, prices of, and other relevant information about the service providers, to the user via the application 108. In other embodiments, a user may pre-select a particular service provider, in which case the application 108 may only show information relating to the pre-selected service provider. In some embodiments, the application 108 displays various dates on which the user may schedule the service appointment to service the tires 102.

In step 216 of the method 200, the application 108 sends scheduling information to the service provider to schedule the service appointment. The scheduling information may include information about the vehicle 100, such as make, model, year, options, and other information necessary or helpful for the service appointment. The scheduling information may also include information about the user, such as name, address, contact information, and other information necessary or helpful for the service appointment. Additionally, the scheduling information may include information about the tires 102 currently installed on the vehicle 100, such as manufacturer, size, color and other information necessary or helpful for the service appointment.

Figure 3A:
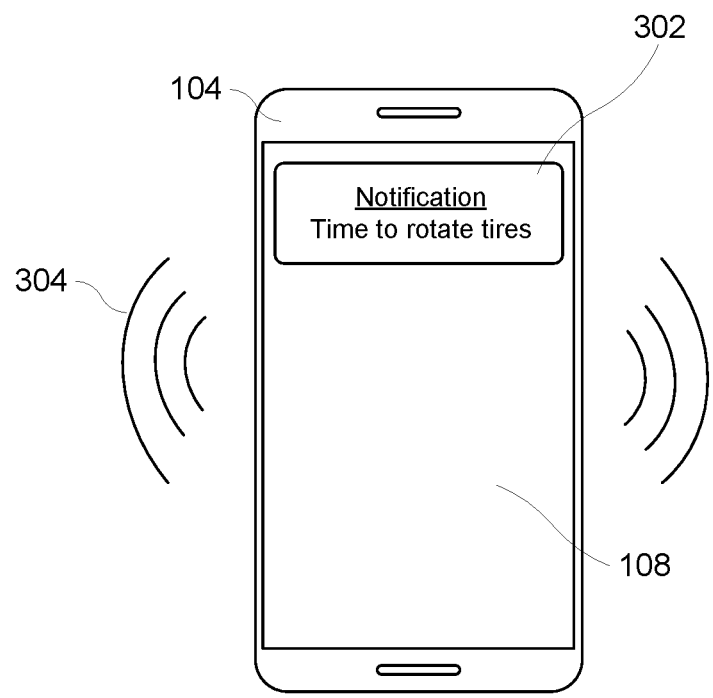
FIG. 3A is a diagram of an example notification, received on a mobile device, according to an embodiment of the current subject matter.

FIG. 3A depicts an example of a notification 302 sent to the user, via the user's mobile device (or other electronic device), informing her that the tires 102 on the vehicle 100 are in need of rotation. In one example, the notification sent here may be analogous to the notification described in step 208 of the method 200 described in relation to FIG. 2. In some embodiments, the notification may comprise a banner, a pop-up, an email, a text message, a social media message, or other forms of notification to inform the user. In some embodiments, the notification 302 may be accompanied by an audible notification 304. In some embodiments, the audible notification 304 may comprise a simple notification tone included with the mobile device 104. In some embodiments, the audible notification 304 may include a spoken prompt to the user, informing her that the tires are in need of service.

Figure 3B:
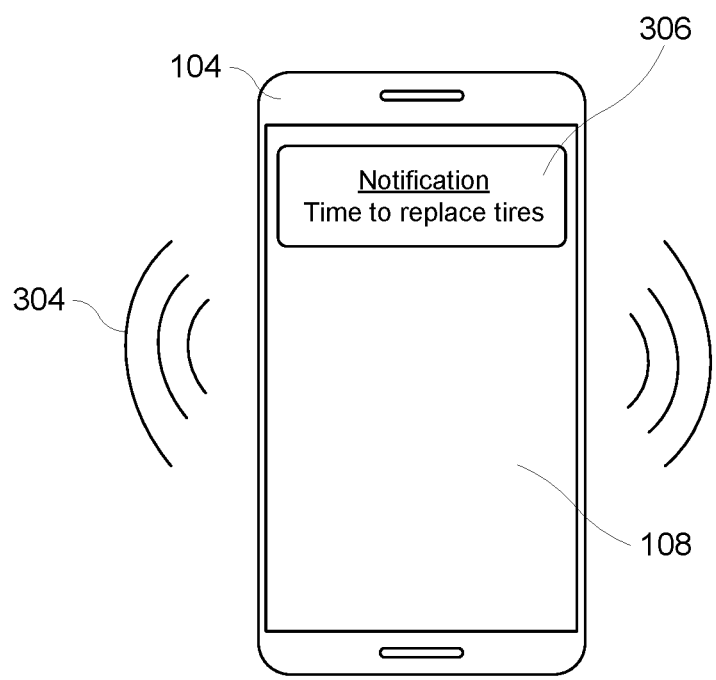
FIG. 3B is a diagram of an example notification, received on a mobile device, according to an embodiment of the current subject matter.

FIG. 3B depicts another example of a notification 306 sent to the user, informing him that the tires are in need of replacement. The notification 306 may include similar characteristics to the notification 302 described above in relation to FIG. 3A. In some embodiments, the notification 306 may also be accompanied by the audible notification 304, verbally informing the user that the tires 102 are in need of replacement.

Figure 4:
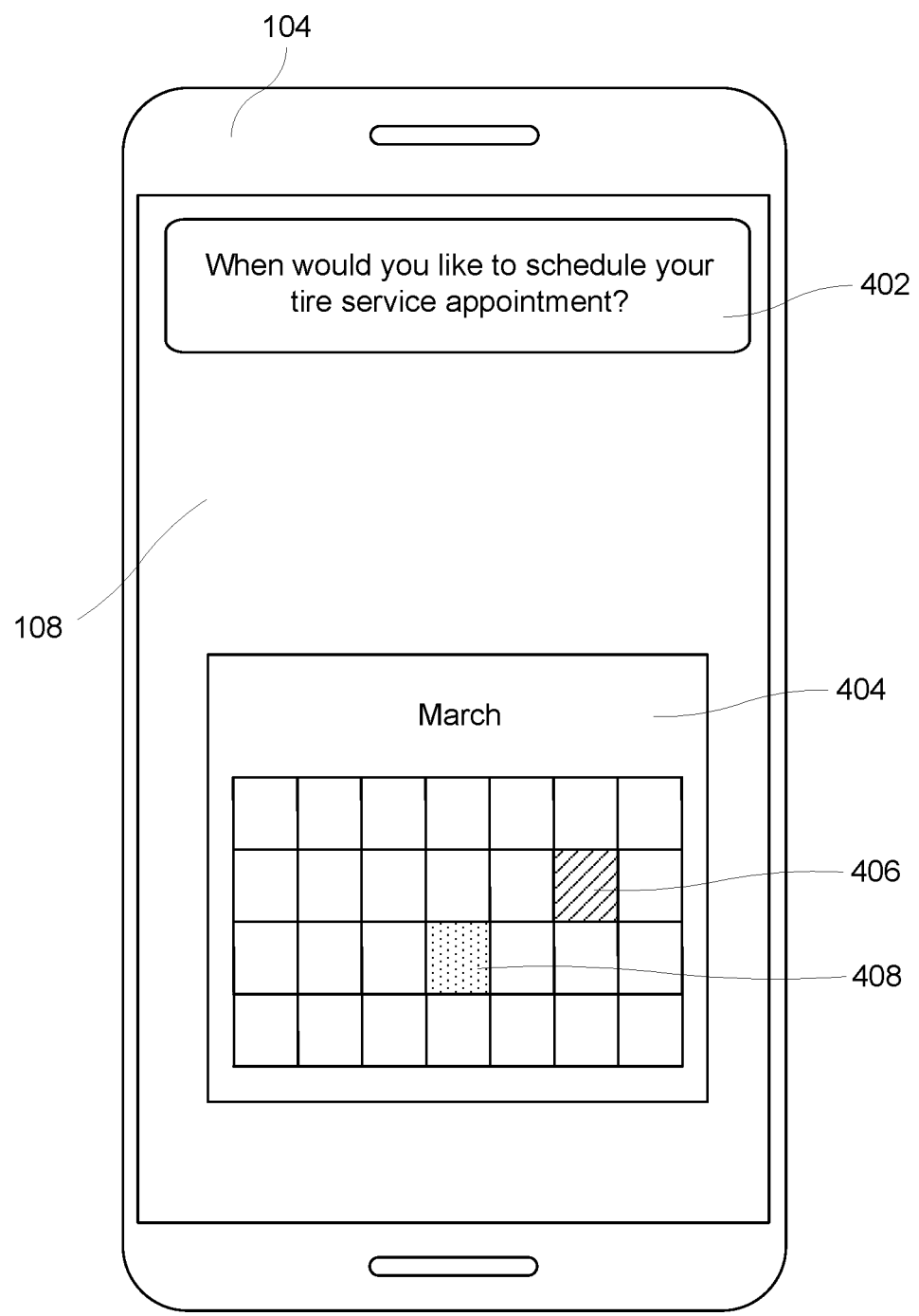
FIG. 4 is a diagram of a scheduling feature, on a mobile device, according to an embodiment of the current subject matter.

FIG. 4 depicts one example of the scheduling feature of the subject matter disclosed herein. In some embodiments, the application 108 may display a scheduling screen for the user to schedule a service appointment. In some embodiments, this may be related to the scheduling step(s) described in the method 200 (for example, steps 210, 214, and 216 of FIG. 2). In some embodiments, a scheduling prompt 402 prompts the user to select a date when the service appointment should take place. In some embodiments, the application 108 displays a calendar 404 offering a visual means of scheduling the service appointment. In some embodiments, the application 108 may display a highlighted day 408 on the calendar 404. In some embodiments, the application 108 may display the highlighted day 408 to suggest a day for the service appointment.

In some embodiments, the application 108 may access a calendar application on the mobile device 104 and display pre-existing appointments or events stored in the calendar application to avoid scheduling conflicts. For example, a busy day 406 indicates that it would be less desirable to schedule a service appointment for that day. In some embodiments, the application 108 may also add an appointment to the calendar application of the mobile device 104 to inform the user or others viewing the calendar of the scheduled service appointment.

Figure 5:
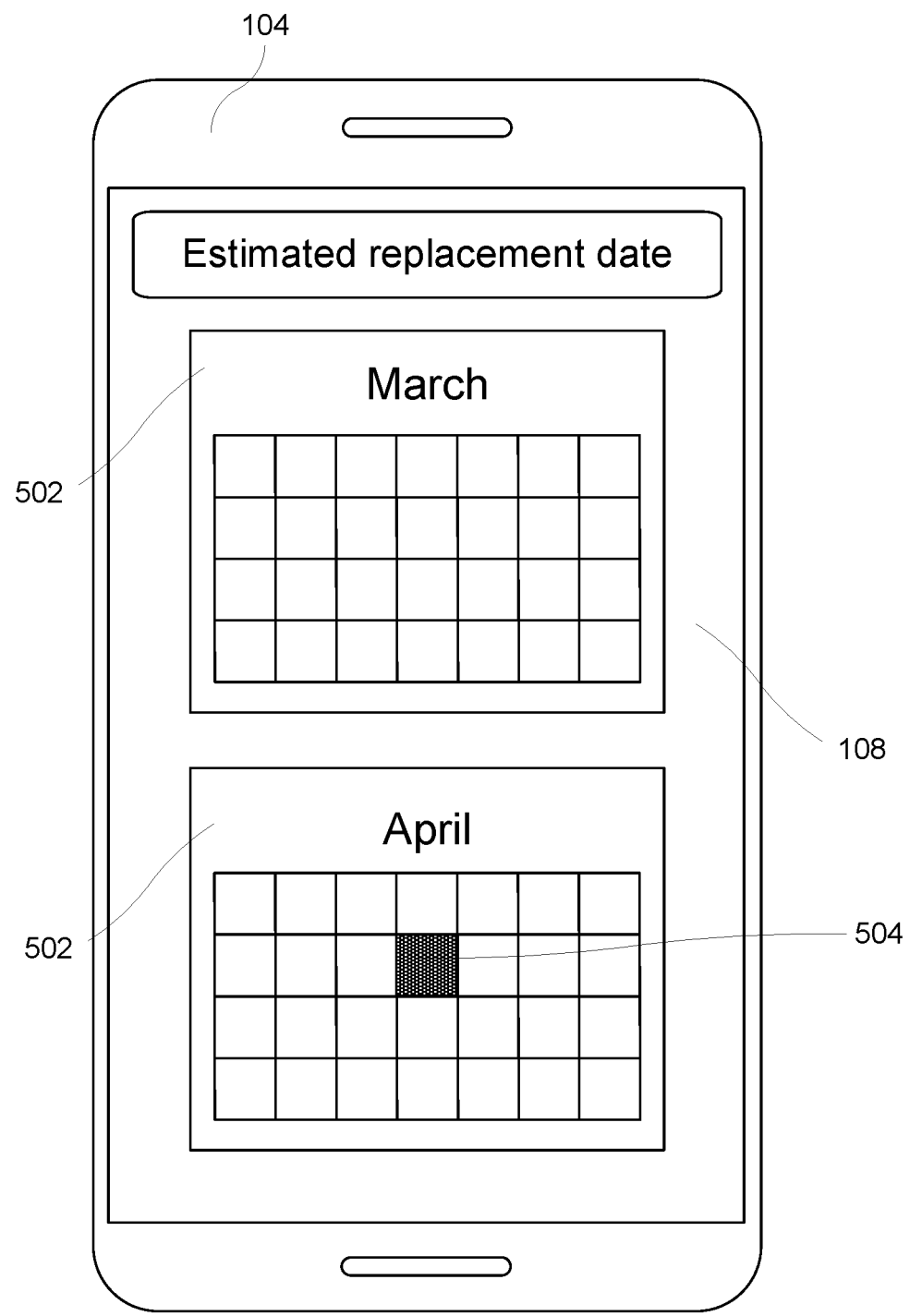
FIG. 5 is a diagram of another scheduling feature, on a mobile device, according to an embodiment of the current subject matter.

FIG. 5 depicts aspects of the scheduling feature of the current subject matter. In some embodiments, the application 108 may also predict an approximate date by which the distance travelled limit for the current tires 102 may be reached. Because the application 108 is tracking the distance travelled, the application 108 may extrapolate patterns and distances travelled based on past trips to predict when the tires 102 of the vehicle 100 may need to be rotated, replaced, or otherwise serviced. In the example depicted in FIG. 5, the application 108 displays a calendar 502 to visually display the predicted replacement date 504 to the user. As the user continues travelling and tracking the distance travelled, the application 108 may update and refine its predication as to the date by which the distance travelled limit will be reached. As described above, in some embodiments, the application 108 may also access a calendar application on the mobile device 104 to display pre-existing appointments or events and display these on the calendar 502 such that a user may avoid conflict between service appointments and pre-existing appointments or events.

Figure 6:
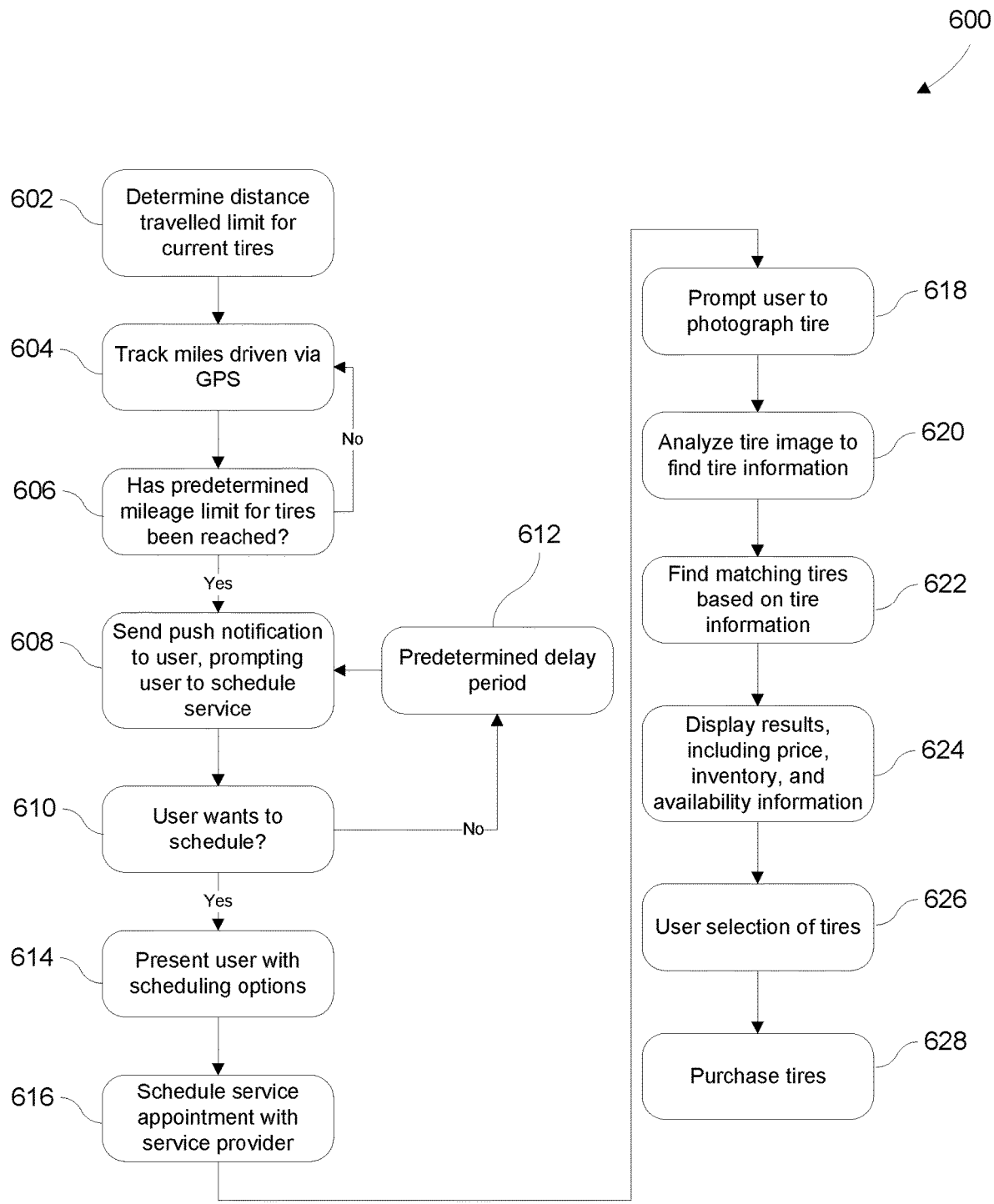
FIG. 6 is a flow-chart diagram of a method of tire tracking and notification according to an embodiment of the current subject matter.

FIG. 6 depicts a method 600 for tire service tracking and notification. Steps 602 through 616 of the method 600 are analogous to steps 202 through 216, respectively, of the method 200 discussed in relation to FIG. 2. As such, their description will not be repeated here.

In the example of the method 600 shown in FIG. 6, additional steps are included. In some embodiments, in step 618 of the method 600, the application 108 prompts the user to take a photo of the tire 102 to be replaced. The user may take a new picture, or use a picture already stored on the mobile device 108. As an alternative, the user may input the data from the tire manually, if the particular mobile device 108 does not have a camera, or if conditions do not allow for an ideal picture. In some embodiments, the user may simply input the information about the vehicle 100 and the application 108 may look up the default tire size, brand, or other parameters needed to find suitable replacement tires 102. In some embodiments, the application 108 may prompt the user for various photos on different areas of the tire to find the correct information. In some embodiments, the application 108 may allow the user to take photos of multiple tires 102 (for example, in cases where the rear tires 102 are of a different configuration than the front tires 102).

In step 620 of the method 600, the application 108 analyzes the image of the tire to extract information about the tire printed on the tire itself. This may be performed by optical character recognition, recognition of barcodes or other coded information found on tires themselves, or by other methods. In some embodiments, the application 108 may allow the user to analyze tire information of multiple tires (for example, in cases where the rear tires 102 of a vehicle are of a different configuration than the front tires 102).

In step 622 of the method 600, the application 108 then searches databases, internet search engines, retailer websites, or other resources to find tires that match the tires detected in the image. In some embodiments, and possibly depending on the user's preferences, alternative tires that sufficiently match the current tires 102 specifications could also be searched. In this way, different alternatives could be suggested to the user, and the user could prioritize price, performance, or other metrics that would be most helpful to the individual user.

In step 624 of the method 600, the application 108 displays results of the search, including price, inventory, availability, and other pertinent information to the user to facilitate the user's decision as to what tires to use.

In step 626 of the method 600, the user considers the information presented, and selects tires to be purchased for the tire replacement out of the provided search results.

In step 628 of the method 600, after the user selects the tires to be purchased and confirms the purchase, the application 108 communicates with the tire retailer to purchase the tires for the consumer. If the tires are purchased from the service center at which the user has scheduled her appointment, nothing more is required. If they are not, then the tires may then be shipped to the service center.

In some embodiments of the method 600 of FIG. 6, steps 618 through 622 may be performed before step 602. In other words, during initial setup, or immediately after putting new tires 102 on the vehicle 100, the application 108 may proceed through steps 618 and 620 by prompting the user to take a picture of the tire and analyzing the image to find the tire information. In this way, the application 108 can determine the distances travelled at which rotation, replacement or other servicing is suggested by the tire manufacturer and is used throughout the method 600. Other orders or arrangements of various steps may also be performed, depending on the particular situation required. The scope of the present disclosure is not limited by the specific examples discussed herein.

Figure 7:
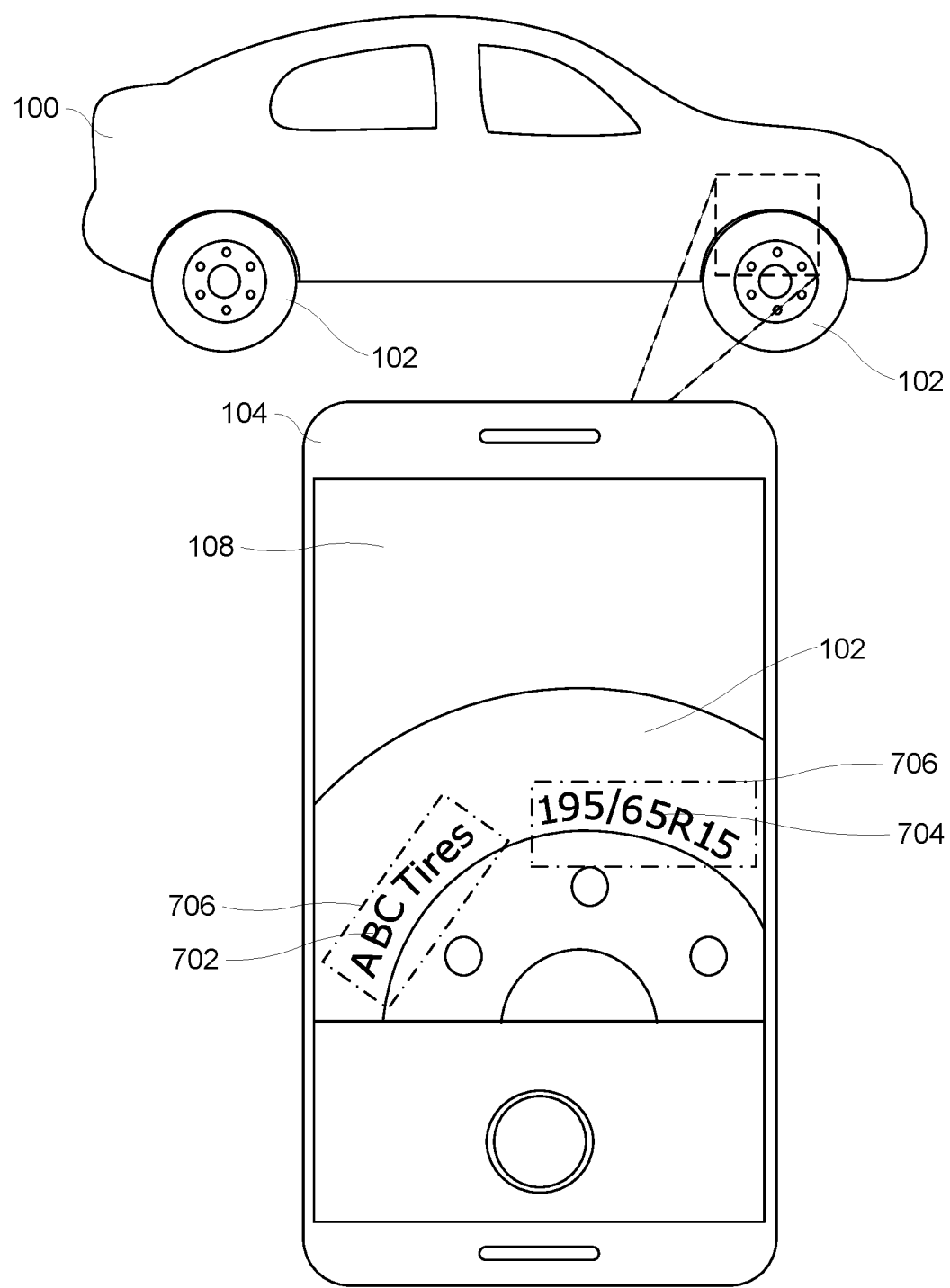
FIG. 7 is diagram of a tire information determination feature, on a mobile device, according to an embodiment of the current subject matter.

FIG. 7 depicts tire information determination functionality of the current subject matter. In some embodiments wherein the user is prompted to take a picture of the tire 102 to extract the information about the tires 102 currently installed on the vehicle 100. In some embodiments, the user may use the mobile device 108 as a viewfinder to take an appropriate picture.

In some embodiments, the tire information includes a brand 702, and a tire size 704. In some embodiments, the tire information includes other information, such as color, style (such as white wall or other aesthetic designs), text color, or other information about the tires 102 installed on the vehicle 100.

In some embodiments, the application 108 will add highlights 708 around the detected tire information. With these highlights, the user can then verify that the application 108 is finding the correct information of the tire 102. In some embodiments, the user can manually define the areas in which the application should look for the tire information.

In some embodiments, the application 108 displays the detected tire information, so that the user can then verify the tire information manually. In some embodiments, the user may also correct the detected information based on a comparison of the photo (or the actual tire 102) and the detected tire information.

In some embodiments, the application 108 will simply access photos stored on the mobile device 108. In some embodiments, the application 108 may open a camera application on the mobile device to take a photo from within the application 108. In some embodiments, the application 108 will switch to the camera application of the mobile device 108 to take the picture to be accessed by the application 108. In some embodiments, the application 108 simply accesses the camera and stores an image (once it recognizes the information to be extracted from the image, discussed in more detail below) without the user needing to manually actuate the camera.

Figure 8:
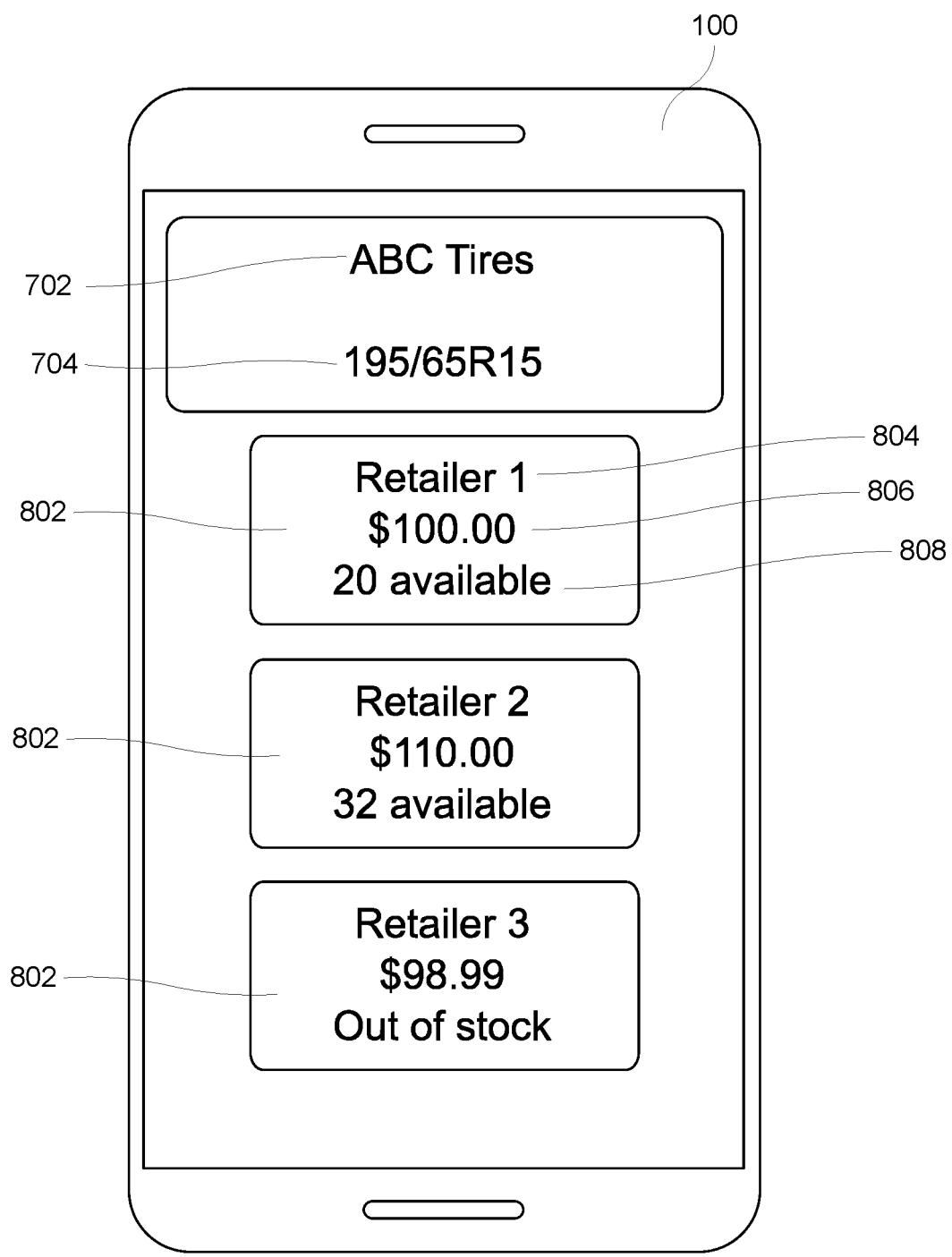
FIG. 8 is a diagram of example search results for tires, on a mobile device, according to an embodiment of the current subject matter.

FIG. 8 depicts an example of search results for tires presented to the user. In some embodiments, the application displays the tire information, including the tire brand 702 and the tire size 704. In addition, the application 108 presents various search results 802, each of which contain a variety of information. In this example, the search result information comprises a retailer 804, a price 806, and the quantity 808 available at the retailer 804. In some embodiments, the user can define what types of information he would like to be displayed on the search results, and filter and sort based on different criteria to prioritize different metrics in the search results.

Figure 9:
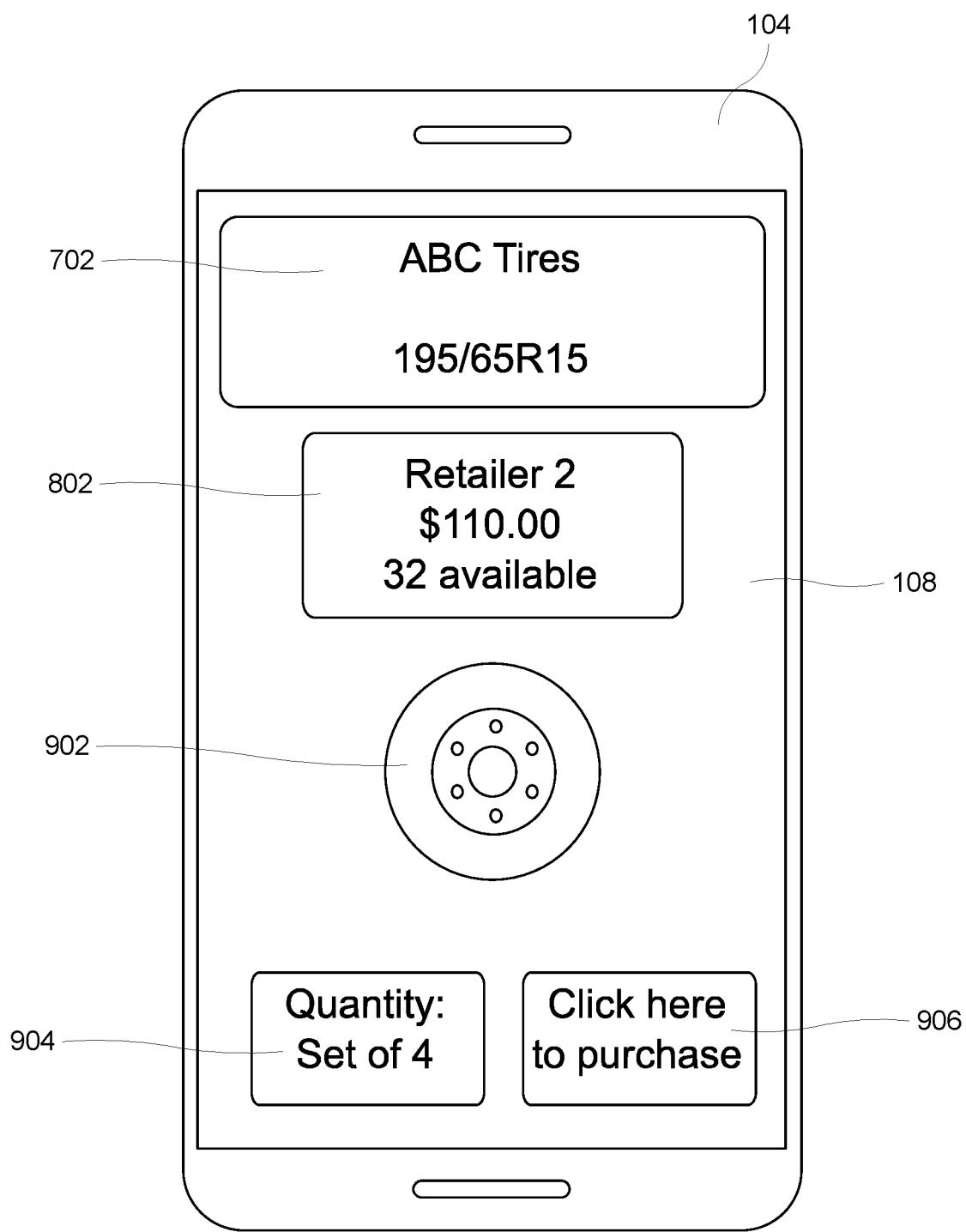
FIG. 9 is a diagram of a purchase page, on a mobile device, according to an embodiment of the current subject matter.

FIG. 9 depicts an example of a purchase page where a user can purchase the tires that she selected. In some embodiments, the purchase page allows the user to purchase the desired tires directly from the supplier or retailer that is selling the tires. In other embodiments, the application handles the payment processing and entire purchasing process instead of sending the user to an external website or application to purchase the tires.

In some embodiments, the application 108 displays the search results 802 of the selected tires to be purchased, along with an image 902 of the tires to be purchased, further assisting the user to make an appropriate choice when purchasing new tires for the vehicle 100. In some embodiments, the application 108 displays the quantity to be purchased 904 and a purchase button 906 to purchase the tires for the vehicle. In some embodiments, the application 108 also displays the image taken to identify the tires (as described above in relation to FIG. 7, for example) with the image of the tires to be purchased. In some embodiments, the application 108 can also superimpose an image of the tires to be purchased on an image of the vehicle 100 so that the user may see how the tires would appear on the vehicle 100.

The schematic flow chart diagrams and method schematic diagrams described above are generally set forth as logical flow chart diagrams. As such, the depicted order and labeled steps are indicative of representative embodiments. Other steps, orderings and methods may be conceived that are equivalent in function, logic, or effect to one or more steps, or portions thereof, of the methods illustrated in the schematic diagrams.

Additionally, the format and symbols employed are provided to explain the logical steps of the schematic diagrams and are understood not to limit the scope of the methods illustrated by the diagrams. Although various arrow types and line types may be employed in the schematic diagrams, they are understood not to limit the scope of the corresponding methods. Indeed, some arrows or other connectors may be used to indicate only the logical flow of a method. For instance, an arrow may indicate a waiting or monitoring period of unspecified duration between enumerated steps of a depicted method. Additionally, the order in which a particular method occurs may or may not strictly adhere to the order of the corresponding steps shown.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A method for tire service notification, the method comprising steps of:
   tracking a distance travelled on a set of tires of a vehicle via global positioning system (GPS) tracking on a mobile device;
   determining a distance travelled threshold at which the set of tires should be serviced;
   determining whether the distance travelled has exceeded the distance travelled threshold; and
   notifying a user via the mobile device that the distance travelled has exceeded the distance travelled threshold and that tire service should be performed.

2. The method of claim 1, further comprising steps of:
   retrieving service center availability information from a service center;
   prompting the user for user availability information;
   scheduling a service appointment with the tire service center based on the service center's availability information and the user availability information; and
   sending information about the scheduled service appointment to the service center.

3. The method of claim 1, further comprising steps of:
   prompting the user for information about the vehicle; and
   identifying compatible tires based on the information about the vehicle.

4. The method of claim 1, further comprising steps of:
   taking a photo of one tire of the set of tires;
   extracting tire information from the photo; and
   searching for compatible tires based on the tire information extracted from the photo.

5. The method of claim 4, further comprising a step of obtaining inventory availability information related to the compatible tires from a tire vendor.

6. The method of claim 5, further comprising a step of redirecting the user to the tire vendor's website.

7. The method of claim 5, further comprising steps of:
   receiving payment information from the user; and
   processing the payment information to purchase the compatible tires.

8. The method of claim 1, wherein the tire service to be performed comprises rotation of the set of tires.

9. The method of claim 1, wherein the tire service to be performed comprises replacement of the set of tires.

10. The method of claim 1, further comprising steps of:
    establishing a connection between the mobile device and the vehicle; and
    determining whether the distance travelled should be tracked based on the presence of the connection between the mobile device and the vehicle.

11. A computer program product comprising a non-transitory computer readable storage medium that stores code executable by a processor, the executable code comprising code to perform steps of:
    tracking a distance travelled on a set of tires via global positioning system (GPS) tracking on a mobile device;
    determining a distance travelled threshold at which the set of tires should be serviced;
    determining whether the distance travelled has exceeded the distance travelled threshold; and
    notifying a user via the mobile device that the distance travelled has exceeded the distance travelled threshold and that tire service should be performed.

12. The computer program product of claim 11, wherein the executable code further comprises code to perform steps of:
    taking a photo of one tire of the set of tires;
    extracting tire information from the photo; and
    searching for compatible tires based on the tire information extracted from the photo.

13. The computer program product of claim 11, wherein the executable code further comprises code to perform steps of:
    prompting the user for information about the vehicle; and
    identifying compatible tires based on the information about the vehicle.

14. The computer program product of claim 11, wherein the executable code further comprises code to perform steps of:
    taking a photo of one tire of the set of tires;
    extracting tire information from the photo; and
    searching for compatible tires based on the tire information extracted from the photo.

15. The computer program product of claim 14, wherein the executable code further comprises code to perform a step of obtaining inventory availability information related to the compatible tires from a tire vendor.

16. The computer program product of claim 15, wherein the executable code further comprises code to perform a step of redirecting the user to the tire vendor's website.

17. The computer program product of claim 15, wherein the executable code further comprises code to perform steps:
    receiving payment information from the user; and
    processing the payment information to purchase the compatible tires.

18. The computer program product of claim 11, wherein the tire service to be performed comprises rotation of the set of tires.

19. The computer program product of claim 11, wherein the tire service to be performed comprises replacement of the set of tires.

20. The computer program product of claim 11, wherein the executable code further comprises code to perform steps of:
    establishing a connection between the mobile device and the vehicle; and
    whether the distance travelled should be tracked based on the presence of the connection between the mobile device and the vehicle.

* * * * *